United States Patent

[11] 3,579,264

[72] Inventors George B. Mork
Baraboo, Wis.;
Donald J. Morse, Davenport, Iowa
[21] Appl. No. 770,332
[22] Filed Oct. 24, 1968
[45] Patented May 18, 1971
[73] Assignee Gulf & Western Industries
New York, N.Y.

[54] REVERSIBLE PROGRAMMER FOR ELECTRIC CIRCUITS
8 Claims, 4 Drawing Figs.

[52] U.S. Cl. .................................................. 219/486, 200/38
[51] Int. Cl. .................................................. H05b 1/02
[50] Field of Search .......................................... 219/480, 486, 494; 200/38 (B), 38 (B1)

[56] References Cited
UNITED STATES PATENTS
3,060,299 10/1962 Morgan ........................ 219/494
3,161,758 12/1964 Biermann et al ............... 219/486

Primary Examiner—Bernard A. Gilheany
Assistant Examiner—F. E. Bell
Attorney—Meyer, Tilberry & Body ABSTRACT: An improved reversible programmer having a regulated control sequence in both a forward and reverse direction. The programmer includes a plurality of actuatable control switches and a generally arcuate rotatable cam for sequentially actuating the control switches. A thermally controlled motor means is provided to drive the cam in a forward direction thereby actuating the control switches to energize electrical circuits, or to drive the cam in a reverse direction whereby the control switches are disengaged and the circuit deenergized. A pair of limit switch means are employed for deenergizing the motor means when the cam reaches a specific location. In addition, a clutch means is used to drivingly connect the cam to the motor means.

Patented May 18, 1971

INVENTORS.
GEORGE B. MORK &
DONALD J. MORSE
BY
*Meyer, Tilberry & Body*
ATTORNEYS INVENTORS.
GEORGE B. MORK &
DONALD J. MORSE
BY Meyer, Tilberry & Body
ATTORNEYS Patented May 18, 1971

INVENTORS.
GEORGE B. MORK &
DONALD J. MORSE

BY Meyer, Tilberry & Body

ATTORNEYS

REVERSIBLE PROGRAMMER FOR ELECTRIC CIRCUITS

This invention is directed to the art of control apparatus and more particularly to an improved reversible programmer.

The invention is particularly applicable for controlling the sequential energization and deenergization of heating elements in an electrical heating system and will be described with particular reference thereto; however, it should be appreciated that the invention has broader applications and may be used whenever it is desired to sequentially regulate the operation of a plurality of electrical circuits.

Heating systems generally include a plurality of heating elements which are responsive to the commands of a temperature sensing device, such as a thermostat. It is well known in the heating control art to regulate the aforementioned system by use of a programmer which sequentially energizes or deenergizes the heating elements, thereby providing the requisite amount of heat called for by the thermostat. These programmers usually include a plurality of cams mounted on a common shaft and having an initial position and a final position; each cam operating a respective control switch. As more heat is called for, the cams actuate additional control switches, which in turn causes additional heating elements to be energized. Similarly, when less heat is required the cams disengage the control switches thereby deenergizing some of the heating elements. The cams are driven by a thermally controlled reversible motor, and are connected to the motor by means of a clutch mechanism. The components of the programmer heretofore described are enclosed in a container for installations at an appropriate location within the heating system.

One of the principal problems with a programmer of this type is that the reversible motor continues to operate even though the cams are in either their initial or final positions. This causes the motor to wear rapidly and eventually burn out, necessitating frequent replacement which results in high maintenance costs.

Another problem with programmers of this type is the failure to provide a regulated return sequence. When a heating element is first energized from its ambient state, the circuit resistance is quite low resulting in a markedly higher inrush current flow than normally exists once the element is hot. By sequencing the energization of the heating elements, this sudden demand for a high current output is minimized since only one element per time interval is introduced into the circuit. Although existing programmers have a regulated sequence when there is a demand for heat, they do not operate in this manner absent such a demand. As such, when the thermostat indicates that less heat is desired, the cams of the programmer immediately return to their initial positions, thereby deenergizing all the heating elements at once. Thus, when the demand for heat is reinstated, the heating system cannot operate at full capacity, but instead must be sequenced from the cam's initial positions. This shortcoming has placed electric heating systems at a competitive disadvantage since gas or oil units produce full capacity almost instantaneously.

A further problem with programmers of this type is the difficulty in obtaining and replacing component parts. The high inrush current requirements of the heating elements cause the control switches to periodically burn out. The replacement of these switches has proved difficult due to the use of nonstandardized parts and their inaccessibility within the container. Replacement usually necessitates dismantling the entire programmer to gain access to the defective switch. The same problem is equally applicable to the reversible motor which intermittently burns out due to continuous operation.

An additional problem with programmers of this type lies in the use of electromechanical clutches. These devices require periodic lubrication, which if not provided, will eventually cause the clutch to fail. Furthermore, the degree of accuracy obtainable with an electromechanical clutch is not sufficient to meet the acute needs of a complex heating system.

The present invention contemplates a new and improved reversible programmer which overcomes all of the above referred problems and others by providing a means for deenergizing the motor when the cam is in either the initial or final position. A clutch is employed which obviates the need for lubrication and increases the degree of accuracy obtainable with the programmer. A regulated return sequence has been incorporated in order to maximize the instantaneous heat output capacity of the system. Furthermore, the novel arrangement of readily available components yields a programmer whose parts may be rapidly, easily and inexpensively replaced.

The present invention contemplates that a heating system be provided for controlling the temperature conditions of a space. The system should include a heat pump having a plurality of heating elements together with a programmer to sequentially energize and deenergize the elements. A thermostat is provided which is responsive to the temperature of the space for purposes of actuating the programmer. A source of power together with a suitable electrical circuit is provided for interconnecting the heat pump, programmer and thermostat.

In accordance with one aspect of the present invention there is provided an improved reversible programmer having a regulated control sequence in both a forward and reverse direction. The programmer comprises a generally arcuate rotatable cam having an initial position and a final position. A plurality of actuatable control switches coaxially circumscribe at least a portion of the periphery of the cam, and means are carried by the cam for sequentially actuating the control switches upon rotation of the cam. A thermostatically controlled motor means is provided for driving the cam in a forward direction incident to a demand for heat or in a reverse direction absent a demand for heat, whereby the control switches are either sequentially actuated to energize the heating elements or sequentially disengage to deenergize the heating elements respectively. There is a first limit switch means for deenergizing the motor means to prevent it from operating in the reverse direction when the cam is in the initial position. In addition there is a second limit switch means for deenergizing the motor means to prevent it from operating in the forward direction when the cam is in the final position. A clutch means is used to drivingly connect the cam to the motor means.

In accordance with a second aspect of the present invention a control apparatus is provided having a generally arcuate cam which can rotate from an initial position to a final position. Coaxially circumscribing at least a portion of the periphery of the cam are a plurality of control switches which may be sequentially actuated upon rotation of the cam. A thermally controlled motor means is employed to drive the cam in a forward direction incident to a demand for heat or in a reverse direction absent such a demand, thereby sequentially actuating or disengaging the control switches respectively, to provide a regulated control sequence in both the forward and reverse directions. A first limit switch means is used to deenergize the motor and prevent it from operating in the reverse direction when the cam is in the initial position. Similarly, a second limit switch means deenergize the motor to prevent it from operating in the forward direction when the cam is in the final position. The motor means is drivingly connected to the cam by a clutch means. A frame means is utilized to carry the cam, control switches, motor means, limit switch means and clutch means.

The principal object of the present invention is to provide an improved reversible programmer for controlling the operation of heating systems.

A further object of the invention is to provide a reversible programmer which has a regulated control sequence in both the forward and reverse directions.

Another object of the invention is to provide a reversible programmer which will shut off the motor when the cam is in either the initial or final position.

A still further object of the invention is to provide a reversible programmer which has a high degree of accuracy in both the forward and reverse directions.

An additional object of the invention is to provide a reversible programmer which is comprised of readily available components that may be rapidly, easily and inexpensively replaced.

These and other objects and advantages will become apparent from the following description used to illustrate the preferred embodiment of the invention when read in connection with the accompanying drawings in which.

Figure 1:
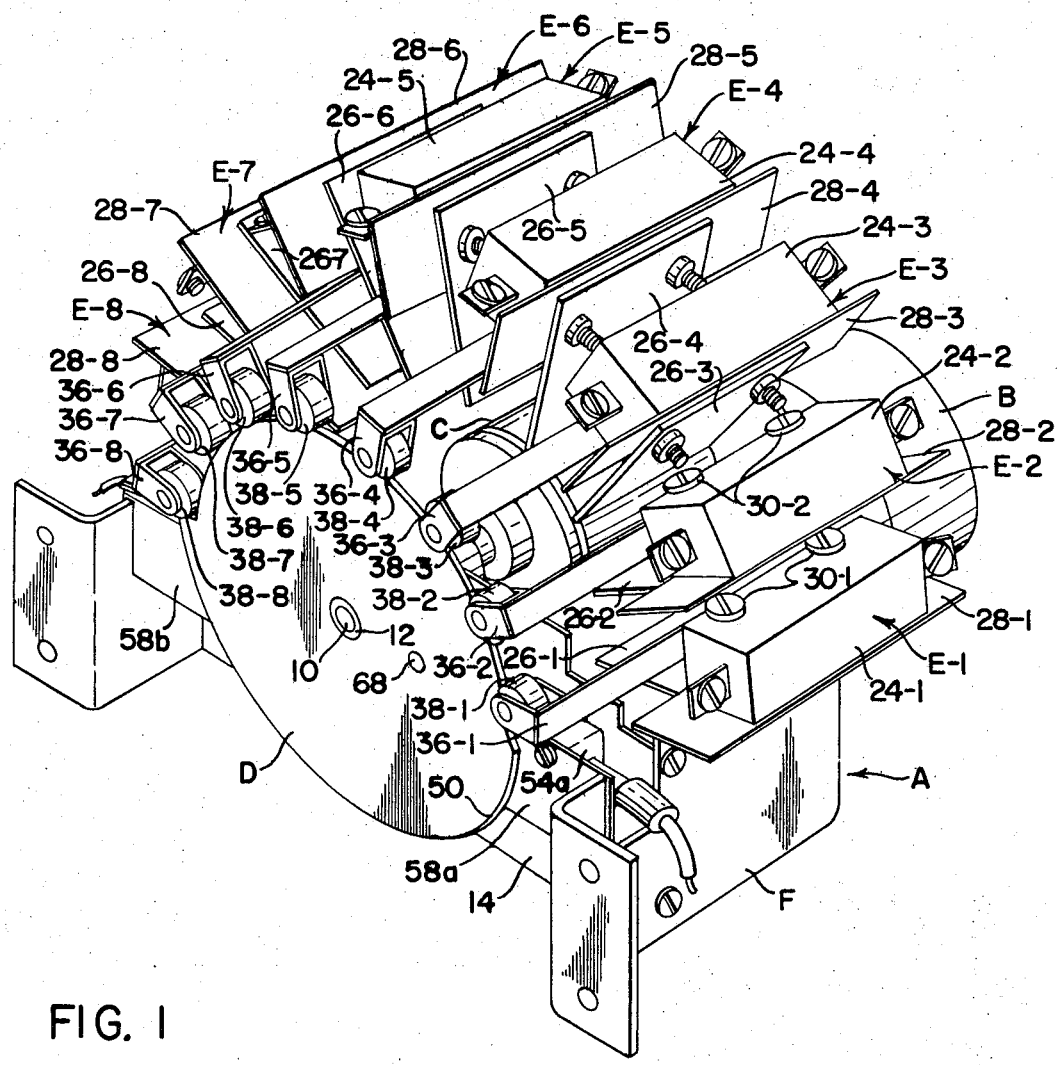
FIG. 1 is a perspective view of a reversible programmer formed according to the present invention.

Referring now to the drawings wherein the showings are for the purpose of illustrating a preferred embodiment of the present invention only and not for the purpose of limiting same, FIG. 1 shows the overall arrangement of the reversible programmer A, including a motor means B, a clutch means C, a cam D, and a plurality of control switch assemblies E–1 to E–8. The aforementioned components are carried by frame means F which is configured to facilitate the replacement of these components.

Still referring to FIG. 1, and FIGS. 2 and 3, the structural features of the programmer A will now be described in detail. The cam D is mounted on the forward end of a rotatable shaft 10, and is retained on the shaft by means of a cam retainer 12. The shaft 10 passes through an opening in the front plate 14 of the frame means F, and has its rearwardmost end connected to clutch means C. A bushing 16 is disposed about the shaft 10 where it passes through the opening in the front plate 14 to prevent forward and rearward movement of the shaft relative to the front plate, and also to assure that the shaft turns freely therein. Mounted on the shaft 10 intermediate the front plate 14 and clutch means C, and adjacent the bushing 16, is a reset assembly 18 to be described in more detail later.

A plurality of control switch assemblies E–1 to E–8 coaxially circumscribe a portion of the periphery of the cam D. This novel arrangement of the control switch assemblies E–1 to E–8 is quite desirable because it provides a configuration in which a burned out assembly may be rapidly, easily and inexpensively replaced. Although eight control switch assemblies E–1 to E–8 have been illustrated, it is to be appreciated, however, that any number of such assemblies may be used depending upon the number of heating elements (not shown) to be energized.

The control switch assembly E–1 is comprised of a control switch 24–1, a control switch mounting bracket 26–1, and an insulator 28–1 intermediate said switch and bracket. The control switch 24–1 and insulator 28–1 are secured to the mounting bracket 26–1 by means of screws 30–1. The mounting bracket 26–1 is affixed in its respective position to the inner face of the rear plate 32 of frame means F by a mounting bracket screw 34. Pivotally connected to control switch 24–1 is a roller arm 36–1, having rotatably mounted at the end thereof, and in contact with the edge surface of the cam D, a roller 38–1. Control switch assemblies E–1 to E–8 have been illustrated as being identical, and conform to the above structural description, however it is to be appreciated that these assemblies may vary in design and yet perform the same function as heretofore described.

In the preferred embodiment the motor means B comprises a thermostatically controlled reversible synchronous motor which is affixed to the outer face of the rear plate 32. The motor B may operate in either a forward or reverse direction, depending upon the nature of the input signal which it receives from the thermostat (not shown). In accordance with the present invention a clutch means C has been provided for coupling the mechanical output of the motor B to the shaft 10. The clutch means C may take many forms, however in the preferred embodiment it is illustrated as being a magnetic clutch. The use of a magnetic clutch is both novel and desirable because it does not require lubrication and it increases the degree of accuracy obtainable by the programmer A. The clutch C is disposed intermediate the rear plate 32 and the front plate 14. A retaining pin 44 projects outwardly from the inner face of the rear plate 32, and is connected to tab 46 of the clutch C to prevent the outer housing of the clutch from rotating when power is transmitted by the motor B to the clutch.

Figure 2:
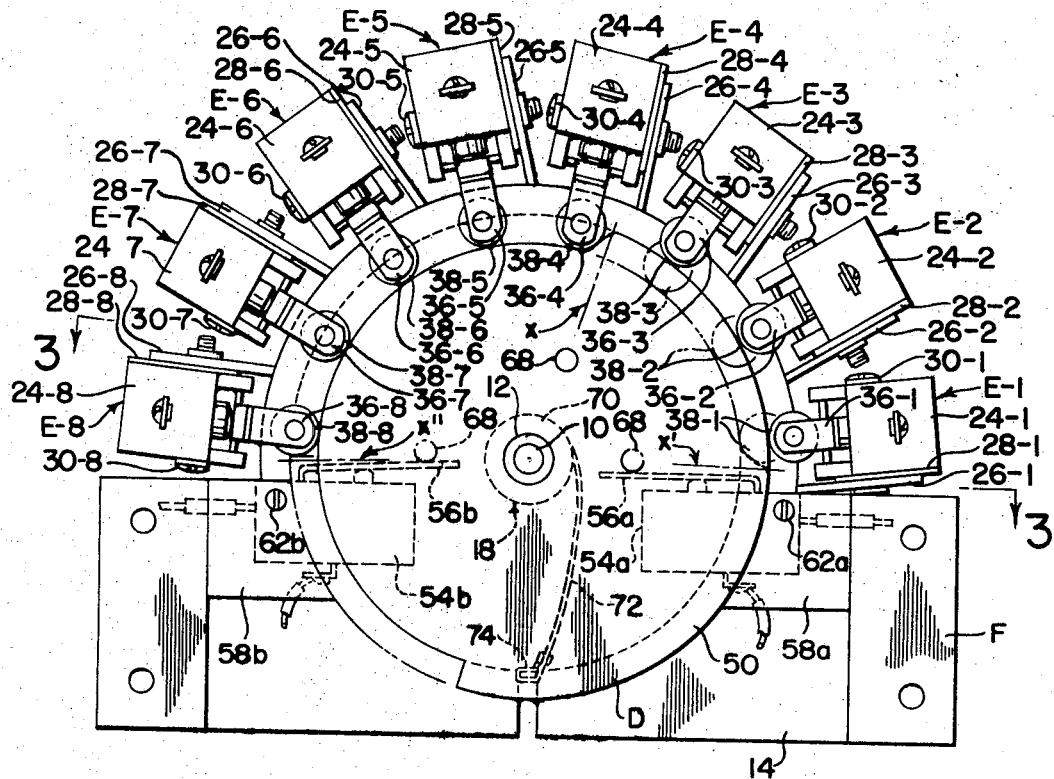
FIG. 2 is a front elevational view of a reversible programmer formed according to the present invention.
Figure 3:
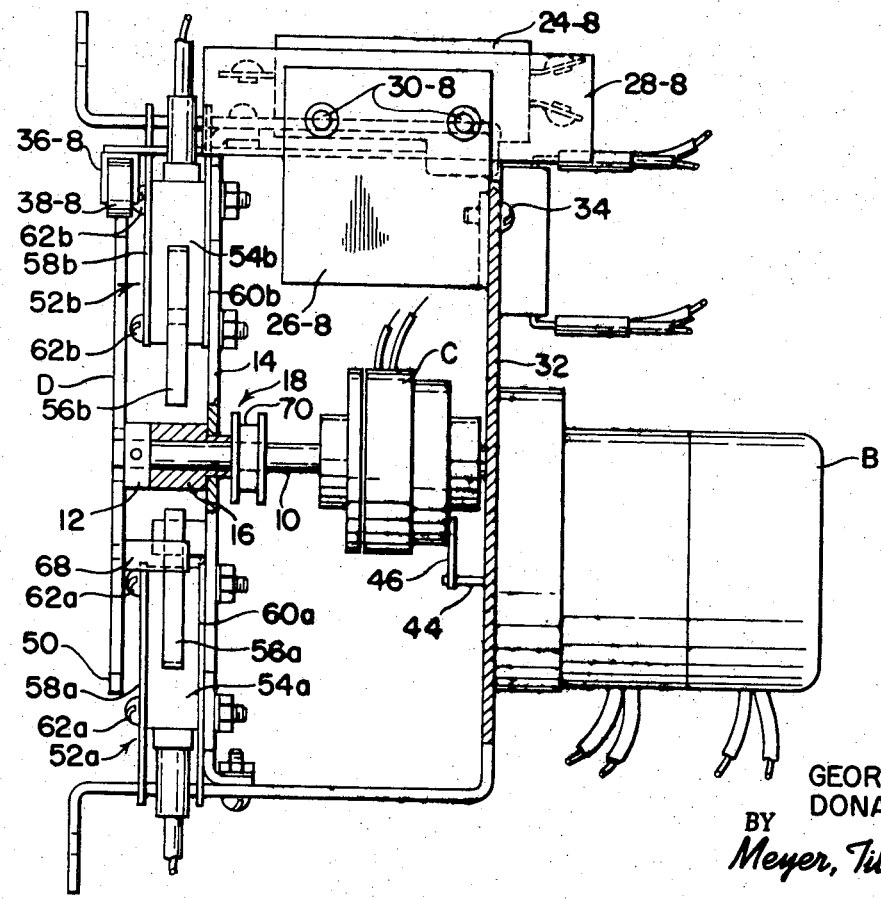
FIG. 3 is a cross-sectional view taken approximately on line 3—3 of FIG. 2; and, FIG. 4 is a schematic representation of the present invention as applied to an electric heating system.

As best shown in FIG. 2, the cam D has an actuator means for sequentially actuating the control switches 24–1 to 24–8 upon rotation of the cam. Although the actuator means may take many forms, such as a photoelectric system or a radially extending striker rod, in the preferred embodiment it is shown as a lobe 50 on the cam D. As the cam D rotates, the edge surface of the lobe 50 sequentially comes in contact with rollers 38–1 to 38–8 and causes them, and in turn the roller arms 36–1 to 36–8 to which they are rotatably attached, to move radially outward from the cam D toward the control switches 24–1 to 24–8. This movement of the roller arms 36–1 to 36–8 causes the control switches 24–1 to 24–8 to be actuated, thereby energizing their respective electrical circuits.

The cam D, and hence the lobe 50, will assume numerous positions upon rotation of the shaft 10 by the motor B. At the outset the cam D is in the initial position, as depicted by the line $x'$. When the cam D is in the initial position $x'$, the edge surface of the lobe 50 has not as yet made contact with the roller 38–1 of the first control switch assembly E–1. In the initial position $x'$ all of the rollers are in contact with the edge surface of the cam D. As the cam D rotates from the initial position $x'$ the lobe 50 sequentially actuates the control switches 24–1 to 24–8. When all of the control switches 24–1 to 24–8 have been actuated the cam D is in the final position, as depicted by the line $x''$. When the cam D is in the final position $x''$ the lobe 50 has rotated beyond the eighth control switch assembly E–8 and all of the rollers 38–1 to 38–8 are in contact with the edge surface of the lobe. Rotation toward the final position $x''$ constitutes cam travel in a forward direction. Contrarily, when the cam D rotates toward the initial position $x'$, it is traveling in the reverse direction.

As shown in FIG. 2, the cam is in an intermediary position, depicted by the line $x$. The cam D and lobe 50 have rotated to a position intermediate the third and fourth control switches assemblies E–3 and E–4. In so doing, lobe 50 has sequentially actuated the first, second and third control switches 24–1, 24–2 and 24–3, thereby energizing their respective circuits. In this position $x$, the rollers 38–1, to 38–3 of the actuated control switches 24–1 to 24–3 are resting on the edge surface of the lobe 50, while the rollers 38–4 to 38–8 of the unactuated switches 24–4 to 24–8 remain in contact with the edge surface of the cam D, and their respective electrical circuits have not been energized.

In accordance with the present invention, limit switch means are provided for deenergizing the motor B, to prevent it from being subjected to excessive wear and possibly burning out. Although the limit switch means may take many forms, in the preferred embodiment they are shown as a first limit switch assembly 52a and a second limit switch assembly 52b. The limit switch assemblies 52a, 52b are located intermediate the cam D and the front plate 14 of the frame means F. Each limit switch assembly 52a, 52b is comprised of a switch 54a, 54b having an actuator arm 56a, 56b, a forward insulator 58a, 58b in contact with the front face of the switch, and a rearward insulator 60a, 60b in contact with the back face of the switch. The switch assemblies 52a, 52b are affixed to the outer face of the front plate 14 by means of screws 62a, 62b. The first limit switch assembly 52a is mounted in a location which approximately corresponds to the initial position $x'$ of the cam D. The second limit switch assembly 52b is mounted in a location which approximately corresponds to the final position $x''$ of the cam D. It is to be appreciated that the limit switch assemblies 52a, 52b may be located elsewhere, provided they function in a manner similar to that discussed below.

The actuation of the limit switches 54a, 54b is accomplished by means of a limit switch actuator rod 68 which projects outwardly from the rear face of the cam D. When the cam is in the initial position x', the actuator rod 68 causes the actuator arm 56a of the first limit switch 54a to be depressed. This causes the motor B to be deenergized and prevents it from operating in the reverse direction. Similarly, when the cam is in the final position x'', the actuator rod 68 causes the actuator arm 56b of the second limit switch 54b to be depressed. This results in the motor B being deenergized and prevents it from operating in the forward direction. When the cam D is in any of the numerous intermediary positions, such as position x, the actuator rod 68 is not in contact with either of the actuator arms 56a, 56b, and as such, has no effect on the operation of the programmer A.

Mounted on the shaft 10, intermediate the bushing 16 and the clutch C, is a reset assembly 18. The reset assembly 18 comprises a spring reel 70, a spring 72 and a spring retainer 74. The spring reel 70 is securely affixed to the shaft 10, such that the shaft and spring reel turn in unison. One end of the spring 72 is attached to the spring reel 70, and a portion of the length of the spring is wound around the spring reel in a manner which will cause the shaft 10 to turn in the reverse direction when no external forces are applied to the shaft. The other end of the spring 72 is connected to the spring retainer 74 which projects outwardly from the inner face of the front plate 14.

Figure 4:
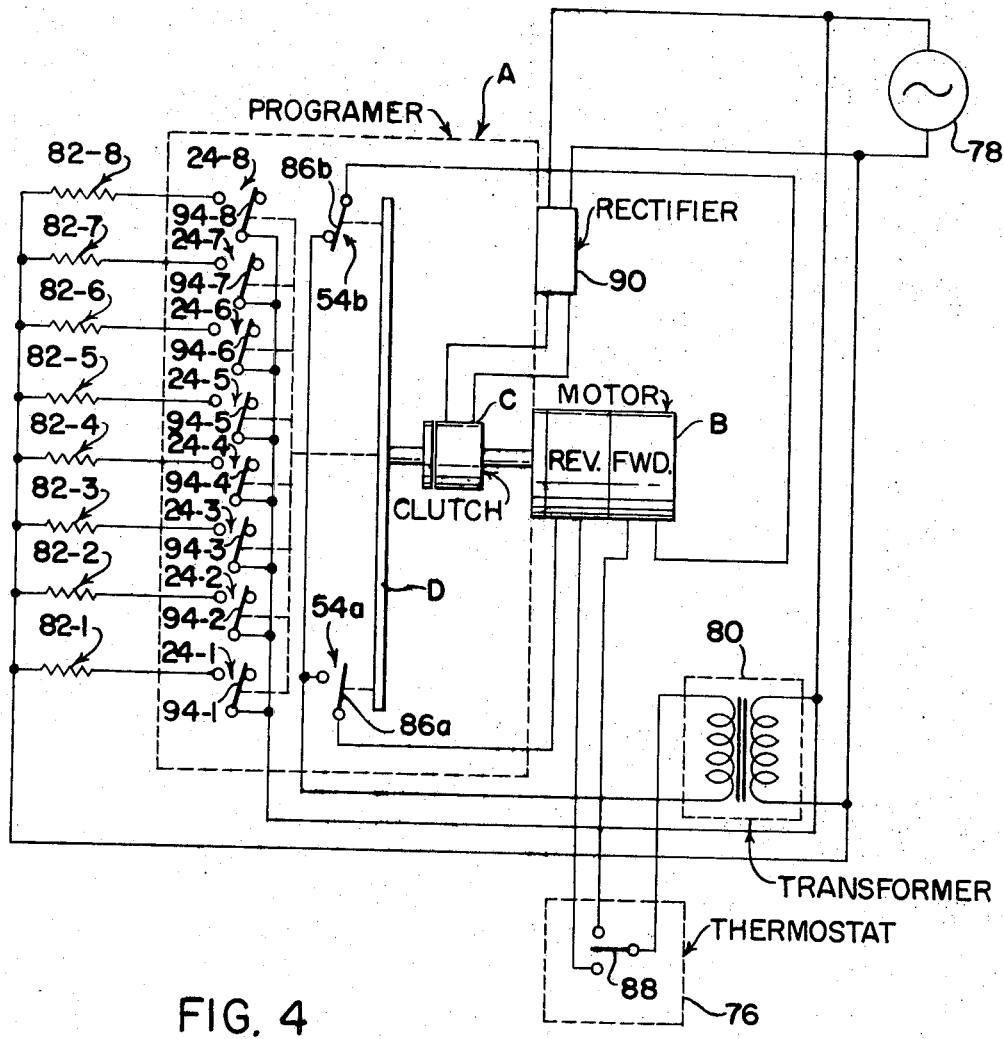

Referring now to FIGS. 2 and 4, wherein the operation of the programmer as a component of a heating system will be described in detail. The heating system is comprised of a thermostat 76 which is responsive to the temperature within a given space, a power source 78, a transformer 80 to stepdown the voltage from the power source, a plurality of heating elements 82-1 to 82-8, and the reversible programmer A.

Assume that the system has not been in previous operation and that all of the components are in their normal start position. As best shown in FIG. 2, this would mean that the cam D is in the initial position x' and that the actuator rod 68 is depressing the actuator arm 56a of the first limit switch 54a. Both of the limit switches 54a, 54b normally have their respective contacts 86a, 86b in the closed position. However, the depression of the actuator arm 56a results in the contacts 86a being opened, thereby deenergizing the reverse winding of the motor B. This feature prevents the motor B from continuing to attempt to drive the cam D in the reverse direction when the cam is in the initial position x', and as such, reduces unnecessary motor wear and possible motor failure.

Assume now that the thermostat 76 has been set at a temperature higher than that which exists in the space being heated. The thermostat contacts 88 will close and drive the motor B in the forward direction. Absent a power failure, the power source 78 and rectifier 90 keep the magnetic clutch C in a constantly energized state. The magnetic clutch C transmits the output of the motor B to the shaft 10, which in turn drives the cam D in the forward direction. As the cam D rotates in the forward direction it actuates the first control switch 24-1, closing the contacts 94-1 so as to energize the first heating element 82-1. The cam D will continue to rotate in the forward direction and sequentially energize additional heating elements 82-2 to 82-8 until the amount of heat required to satisfy the thermostat setting has been reached.

When the desired temperature has been attained the contacts 88 of the thermostat 76 will open to deenergize the motor B and prevent further rotation of the cam D in the forward direction. However, the magnetic clutch C will remain energized, thereby retaining the cam D at a location which corresponds to the point it had reached when the motor B was deenergized. If at a future time a demand for more heat is made, the cam D will begin its forward rotation from the aforementioned position. This mode of operation, as opposed to one in which the cam returns to the initial position when the desired temperature is reached, is much preferred because it permits the heating system to put out a greater amount of instantaneous heat when a demand for it is later made. This is due to the fact that a given number of heating elements are already energized rather than having to be sequentially energized from the initial position x'.

When the cam D rotates in a forward direction from its initial position x' in response to a demand for heat, this causes actuator rod 68 to similarly rotate (as shown in FIG. 2). As such, the contacts 86a of the first limit switch 54a will close, thereby connecting the reverse winding of the motor B to the circuitry. This will not permit the motor B to drive the cam D in a reverse direction, when and if, the thermostat setting calls for a reduction in heat.

Assume that in response to a given thermostat setting the cam D has rotated to an intermediary position such as that depicted by the line x, and that the first, second and third control switches 24-1 to 24-3 have been actuated, thereby energizing their respective heating elements 82-1 to 82-3 (as shown in FIG. 2). Let us further assume that an additional demand for heat is made by closing contacts 88 of the thermostat 76. The forward winding of the motor B will once again be energized, and drive cam D in a forward direction from its intermediary position x. In so doing, additional control switches will be sequentially actuated to energize their respective heating elements. If the demand for heat is sufficiently great, the cam D will rotate until all of the control switches 24-1 to 24-8 have been actuated, thus placing the cam at the final position x''.

As best shown in FIG. 2, when the cam D is in the final position x'' the actuator rod 68 causes the actuator arm 56b of the second limit switch 54b to be depressed, thereby opening contacts 86b. When the contacts 86b are opened the forward winding of the motor B is deenergized. This feature prevents the motor B from continuing to attempt to drive the cam D in the forward direction when the cam has reached the final position x'', and as such, reduces unnecessary motor wear and possible motor failure.

Assume that the cam D is in an intermediary position, such as that depicted by line x. Let us further assume that less heat is desired and that the thermostat 76 is set lower by closing contacts 88. The reverse winding of the motor B will be energized to drive cam D in the reverse direction, thereby sequentially disengaging the requisite number of control switches 24-1 to 24-3 to deenergize their respective heating elements 82-1 to 82-3, until the thermostat setting is satisfied. The programmer A can therefore sequentially energize in the forward direction, as well as sequentially deenergize in the reverse direction, to provide a regulated control sequence in both directions.

In the event of a power failure, the magnetic clutch C will be deenergized, thus disconnecting the shaft 10 and cam D from the motor B. The reset assembly 18 (as shown in FIG. 2) will then be brought into operation. The spring 72 of the reset assembly 18 will cause the shaft 18 to turn in the reverse direction, and the cam D will be rotated until the initial position x' is reached. This results in all of the control switches 24-1 to 24-8 being disengaged and their respective heating elements 82-1 to 82-8 deenergized. When power is restored the cam D will begin its rotation from the initial position to sequentially energize the requisite number of heating elements. This prevents the sudden inrush of current in response to the energization demands of several heating elements, which might otherwise pose a serious current supply problem.

The invention has been described in detail sufficient to enable one skilled in the art of control apparatus to duplicate the invention. Obviously, modifications and alterations of the preferred embodiment described, such as the addition of an outdoor thermostat to further control the programmer, will occur to others upon a reading and understanding of this specification. It is our intention to include all such modifications and alterations as part of our invention insofar as they come within the scope of the appended claims.

We claim:

1. In a heating system for controlling the temperature conditions of a space including a heat pump having a plurality of electrical heating elements, a programmer to sequentially energize and deenergize said heating elements, a thermostat responsive to the temperature of the space to actuate said programmer, a source of power, and circuitry means for interconnecting said heat pump, programmer and thermostat; the improvement wherein said programmer provides a regulated control sequence in both a forward and a reverse direction and comprising:

a generally arcuate rotatable cam having an initial position and a final position;

a plurality of actuatable control switches coaxially circumscribing at least a portion of the periphery of said cam;

means carried by said cam for sequentially actuating said control switches upon rotation of said cam;

thermostatically controlled motor means for driving said cam in a forward direction between the initial position toward the final position incident to a demand for heat or in a reverse direction absent a demand for heat, whereby said control switches are either sequentially actuated to energize said heating elements or sequentially disengaged to deenergize said heating elements respectively;

first limit switch means for deenergizing said motor means to prevent it from operating in the reverse direction when said cam is in the initial position;

second limit switch means for deenergizing said motor means to prevent it from operating in the forward direction when said cam is in the final position; and, clutch means for drivingly connecting said cam to said motor means.

2. The improvement defined in claim 1, wherein said clutch means includes a magnetic clutch which is disengageable upon power failure.

3. The improvement defined in claim 2, including spring means for returning said cam to the initial position when said magnetic clutch disengages due to power failure.

4. The improvement defined in claim 1, wherein said first limit switch means is disposed at a point corresponding to the initial position of said cam.

5. The improvement defined in claim 1, wherein said second limit switch means is disposed at a point corresponding to the final position of said cam.

6. A control apparatus for sequentially energizing or deenergizing a plurality of electrical heating elements comprising:

a generally arcuate rotatable cam having an initial position and a final position;

a plurality of actuatable control switches coaxially circumscribing at least a portion of the periphery of said cam;

means for sequentially actuating said control switches upon rotation of said cam;

thermally controlled motor means for driving said cam in a forward direction incident to a demand for heat or in a reverse direction absent a demand for heat, whereby said control switches are either sequentially actuated or sequentially disengaged respectively, to provide a regulated control sequence in both the forward and reverse directions;

first limit switch means for deenergizing said motor to prevent it from operating in the reverse direction when said cam is in the initial position;

second limit switch means for deenergizing said motor means to prevent it from operating in the forward direction when said cam is in the final position;

clutch means for drivingly connecting said cam to said motor means; and, frame means for carrying said cam, control switches, motor means, limit switch means, and clutch means.

7. The control apparatus defined in claim 6, wherein said clutch means includes a magnetic clutch which is disengageable upon power failure.

8. The control apparatus defined in claim 7, including spring means for returning said cam to the initial position when said magnetic clutch disengages due to power failure.